United States Patent [19]
Skipp et al.

[11] Patent Number: 5,768,648
[45] Date of Patent: Jun. 16, 1998

[54] CAMERA MOUNT FOR CONTROLLED AND STEADY ROLLING MOVEMENT

[75] Inventors: Michael Sidney Skipp, Granada Hills; Michael Stephen Skipp, Encino, both of Calif.

[73] Assignee: Roy Isaia

[21] Appl. No.: 924,798

[22] Filed: Sep. 5, 1997

[51] Int. Cl.$^6$ ..................................... G03B 17/56
[52] U.S. Cl. .................... 396/428; 352/243; 348/373; 248/185.1
[58] Field of Search ..................... 396/419, 427, 396/428; 352/243; 349/373, 143; 248/178.1, 179.1, 185.1, 130

[56] References Cited

U.S. PATENT DOCUMENTS

| | | | |
|---|---|---|---|
| 1,840,556 | 1/1932 | Arnold . | |
| 2,364,363 | 12/1944 | Howell . | |
| 3,603,545 | 9/1971 | Boniface | 248/184 |
| 3,891,301 | 6/1975 | Heller | 350/85 |
| 3,924,828 | 12/1975 | Epperson | 248/179 |
| 4,088,396 | 5/1978 | Edelstein | 350/252 |
| 4,187,051 | 2/1980 | Kirsch et al. | 414/744 |
| 4,217,606 | 8/1980 | Nordmann | 352/243 |
| 4,233,634 | 11/1980 | Adams | 358/229 |
| 4,304,385 | 12/1981 | Farouche et al. | 248/410 |
| 4,341,452 | 7/1982 | Korling | 396/428 |
| 4,655,548 | 4/1987 | Jue | 350/245 |
| 4,734,778 | 3/1988 | Kobayashi | 358/229 |
| 4,763,151 | 8/1988 | Klinger | 354/293 |
| 4,826,116 | 5/1989 | Blaschek et al. | 248/185 |
| 4,941,106 | 7/1990 | Krieger | 364/513 |
| 4,963,903 | 10/1990 | Cane | 354/81 |
| 5,029,795 | 7/1991 | Dexter | 248/431 |
| 5,150,627 | 9/1992 | Lindsay | 74/98 |
| 5,195,707 | 3/1993 | Ignatuk et al. | 248/179 |
| 5,218,439 | 6/1993 | Mizoguchi et al. | 358/209 |
| 5,312,121 | 5/1994 | Chapman | 280/47.11 |
| 5,475,584 | 12/1995 | Bani-Hashemi | 364/167.01 |
| 5,497,214 | 3/1996 | Labree | 354/81 |
| 5,557,329 | 9/1996 | Lim | 348/373 |
| 5,579,071 | 11/1996 | Wetzel et al. | 396/428 |

FOREIGN PATENT DOCUMENTS

531220 A2  10/1993  European Pat. Off. ........ G03B 17/56

OTHER PUBLICATIONS

Roy Isaia, The Equipment Broker, Inc.'s 1996 descriptive brochures and price list for Ronford–Baker products (Fluid 7 MK III & MK IV (Extra Fluid Power) Variable Camera Head, Series 2000fluid Heads with Balance Control, Mini Seven Head, Lightweight Tripod, and General Accessories). A&C Ltd UK's brochure of POWER–POD 2000 Remote Head for Film and TV incl. the Control System (brochure PP2000/9/97).

*Primary Examiner*—A. A. Mathews
*Attorney, Agent, or Firm*—Cislo & Thomas

[57] ABSTRACT

A camera mount for controlled rolling movement includes a base and a camera platform pivotally connected to the base at its aft end. The pivotal connection includes a hollow shaft to accommodate passage of power and video cables to the camera. The forward end of the camera platform is movably supported by a pair of overlapping arc-shaped rails. This forward support steadies the camera and prevents any up-and-down bouncing motion. The aft pivotal connection, arc-shaped rails, and optical axis of the camera are all preferably coaxial. A plurality of gears transmit the motion of a drive motor into the camera platform. A plurality of bearings provide tight but smoothly operating connections between the moving parts of the camera mount. The camera mount provides a 180-degree range of rolling motion. The camera mount further includes an adjustably positioned counterbalance weight for varying the center of gravity of the pivoting platform and camera.

19 Claims, 4 Drawing Sheets

CAMERA MOUNT FOR CONTROLLED AND STEADY ROLLING MOVEMENT

FIELD OF THE INVENTION

The present invention relates generally to a device for supporting a video or film camera, and more particularly to a camera mount for controlled and steady rolling movement of the camera through an extended range of motion.

BACKGROUND

Tripods including three legs and a mounting head are in common use to support optical instruments and cameras of many types. The legs provide stability while the head enables adjustment of the camera position for aiming purposes. A basic tripod is typically equipped with the capability to pan and tilt, but ordinarily lacks the ability to roll the camera. Rolling movements are those in a circular manner or about the optical axis of the camera.

Thus conventionally, in the case of small, lightweight portable video cameras, the photographer holding the camera may lean to one side or the other to rotate the camera. In the case of larger video or film cameras used in studio productions, the camera may be rotated by a complex mechanism having a very large robotic structure. Alternatively, the effect of rolling movements may be added to video or film at a later time through editing.

A camera mounting accessory currently being sold under the brand name Swing™ and French Patent No. 2,681,155 offers some capability of rolling movements, and purportedly may be driven by an electric motor and remote control. The French device includes a camera platform having a curved underside, which may roll over several rods built into the base of the device (See FIG. 7). The rolling movement of the platform, however, is limited to the range of plus or minus 45 degrees.

It is therefore an object of the present invention to provide a camera-mounting device offering controlled rolling movements over a greater range of motion. It is a further object of the present invention to provide such a camera mounting device including an efficient, compact support structure which will not prove unwieldy and overly cumbersome. It is a still further object of the present invention to provide a drive motor effectively integrated into the camera mounting device, enabling controlled and precise rolling movements of the camera. It is yet a further object of the present invention to provide a camera-mounting device including support structure offering steady rolling motion of the camera without any bouncing of the same.

SUMMARY OF THE INVENTION

The present invention is directed to a camera mounting providing controlled and steady rolling movements of the camera over a wide range of motion. More particularly, the present invention includes a camera platform supported at its forward end by a pair of overlapping arc-shaped rails, which slide relative to one another. The aft end of the camera platform is pivotally connected to an upstanding post at the aft end of the base. The pivotal connection is preferably a hollow shaft through which cables from the camera pass to avoid entangling of the same as the platform pivots.

In a preferred embodiment of the present invention, a drive motor, through a plurality of gears, causes the camera platform to roll relative the base. The plurality of gears preferably include worm gears connected to the drive motor, connected to spur gears connected to the aft end of the camera platform.

In the preferred embodiment the arc-shaped rails extend about 90 degrees, such that the platform as supported by the overlapping rails may rotate about 180 degrees. Preferably, a set of rollers lie between the arc-shaped rails, such that the lower rail slidably supports the upper rail. The overlapping arc-shaped rails are key to steadily supporting the camera through the rolling movements without any up-and-down bouncing motions. The two arc-shaped rails, the pivotal connection of the aft end of the camera platform to the base, and the optical axis of the camera are preferably all approximately coaxial. Also preferably included is a counterbalancing means adjustably attached to the platform, for adjusting the center of gravity of the pivoting platform including the camera mounted thereon.

These as well as other features of the present invention will become apparent from the drawings and detailed description which follows. It is understood that changes to the specific structure shown and described may be made within the scope of the claims which follow without departing from the spirit of the invention.

DETAILED DESCRIPTION OF THE INVENTION

The detailed description, as set forth below, in connection with the appended drawings is intended as a description of the construction and operation of the preferred embodiment of the invention, and is not intended to represent the only form in which the present invention may be constructed or operated. It is to be understood that the invention may be practiced by other different embodiments, which are also encompassed within the spirit and scope of the invention.

Figure 1:
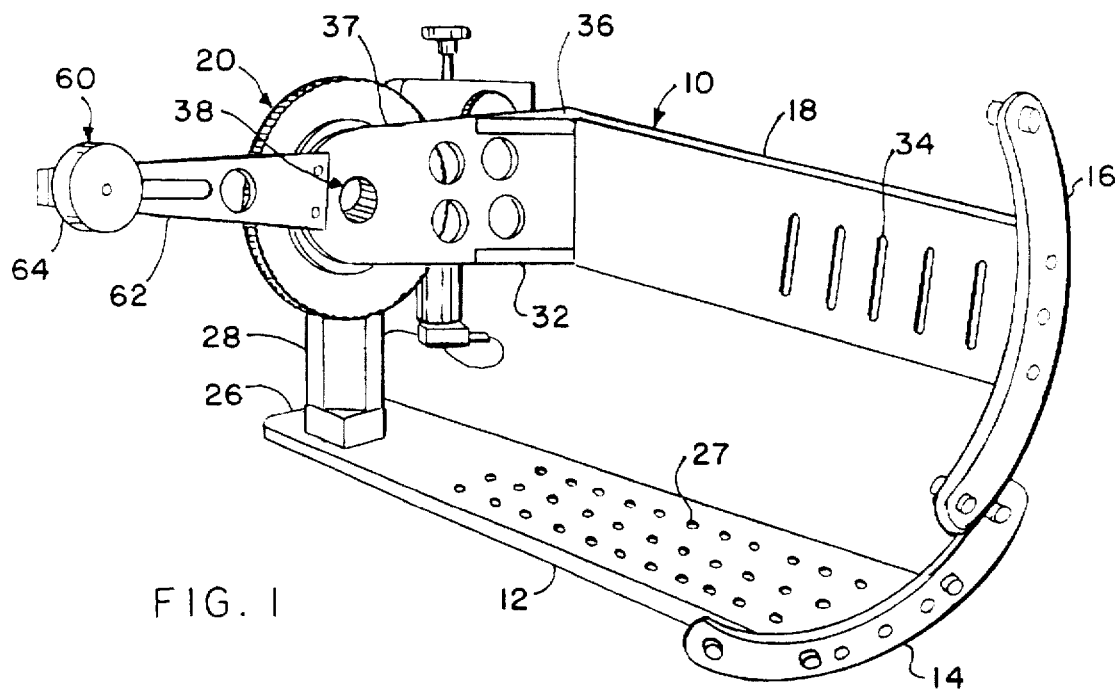
FIG. 1 is a front perspective view of a preferred embodiment of the camera mount for controlled movement in accordance with the present invention.
Figure 2:
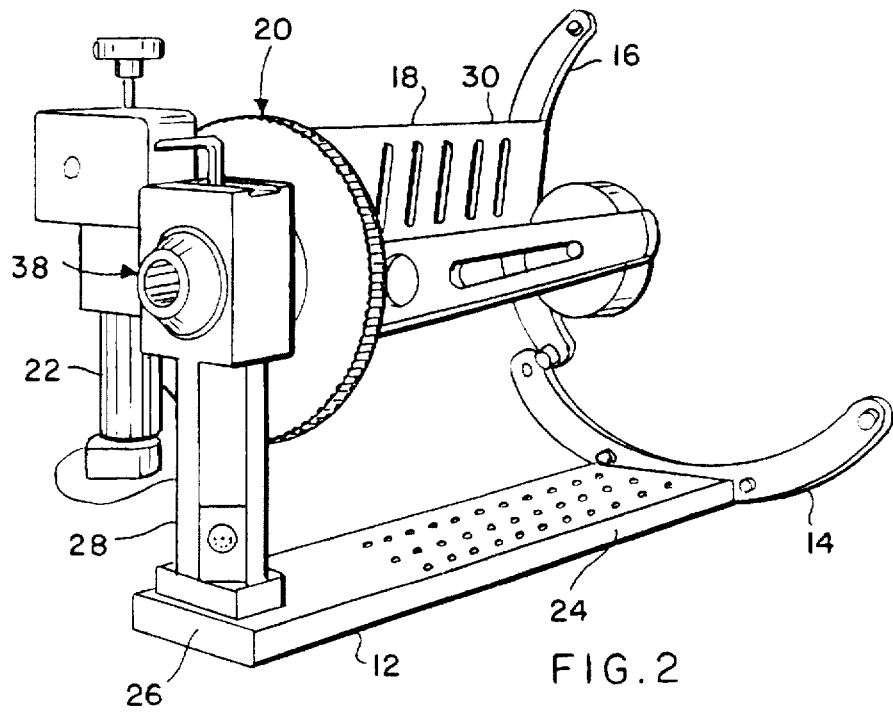
FIG. 2 is a rear perspective view of the preferred embodiment.

The camera mount for controlled rolling movement of the present invention is illustrated in FIGS. 1–5, which depict a presently preferred embodiment of the invention. Referring first to FIGS. 1 and 2, the camera mount 10 is comprised generally of a base 12, first and second arc-shaped rails 14 and 16, a camera platform 18, a plurality of gears 20, and a drive motor 22. A safety cover (not shown) over the plurality of gears 20 can be added to protect users from pinch points, and to prevent accidental entanglement of power and video cables during use.

The base 12 has a forward end 24 and an aft end 26, and is attached to a stationary object (not shown) with conventional fasteners (not shown). The base 12 preferably includes 33 (thirty-three) Helicoil™ thread inserts 27, selected ones of which may be used to attach the base 12 to a flat table, or alternatively to a sloped surface, a vertical wall, a ceiling or other stationary object. Fixedly attached to the forward end 24 of the base 12 is the first arc-shaped rail 14. At the opposing, aft end 26 of the base 12 is an upstanding post 28. The structural parts of the camera mount 10, i.e., the base 12, rails 14 and 16, camera platform 18, etc., are all made from 6061-T6 aluminum.

The camera platform 18 has a forward end 30 and aft end 32. Fixedly attached to the forward end 30 is the second arc-shaped rail 16, which has a slightly smaller diameter than the first rail 14. The second rail 16 is coaxial with the first rail 14. The arc-shaped rails 14 and 16 are shown centrally attached to the base 12 and camera platform 14, but they need not necessarily be so attached. The forward end 30 of the platform 18 further includes a number of slots 34 to accept fasteners (not shown) to secure a conventional video or film camera (not shown). Spacers of various thicknesses (not shown) can be added to raise the level of the camera lens as desired. The aft end 32 of the camera platform 18 preferably includes a fitting 36 and a rear plate 37, which carry the majority of the load of the weight of the camera and the platform 18 to the upstanding post 28.

Figure 6:
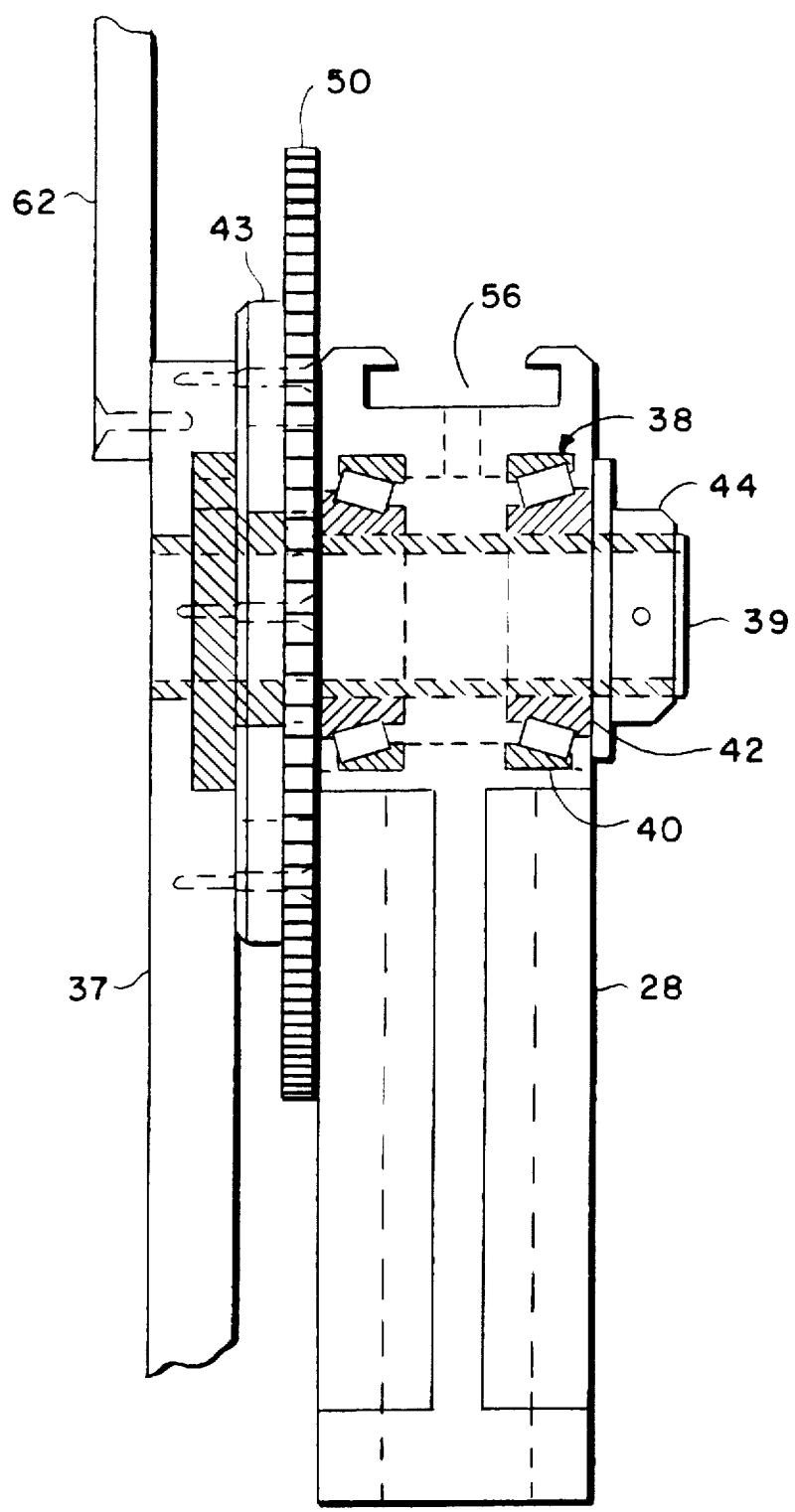
FIG. 6 is a cross-sectional view of the upstanding post and hollow bearing of the preferred embodiment.

The aft end 32 of the camera platform 18 is pivotally connected to the base 12 and upstanding post 28 through use of hollow-shaft, tapered bearings 38. As best shown in FIG. 6, the pivotal connection includes a hollow shaft 39 supported in a hole in the upstanding post 28 by the pair of tapered roller bearings 38. The tapered roller bearings 38 used in opposition to each other each include a bearing cup 40 and a bearing cone 42. A spacer 43 is included between the big wheel gear 50 and the rear plate 37 of the camera platform 18. A nut 44 on the end of the shaft 39 may be tightened to squeeze together the cones 42 and pre-load the bearings 38. This provides a pivotal connection with very little rolling friction and no slack. The hollow shaft 39 includes a one-inch opening through its nodal point to accommodate passage of the power and video cables (not shown) to the camera. This helps prevent snarling of the cables as the platform 18 pivots and the camera rolls. The bearing cup 40 (part no. LM67048XL) and bearing cone 42 (part no. LM67010XL) were purchased from Motion Industries of Panorama City, Calif.

Figure 3:
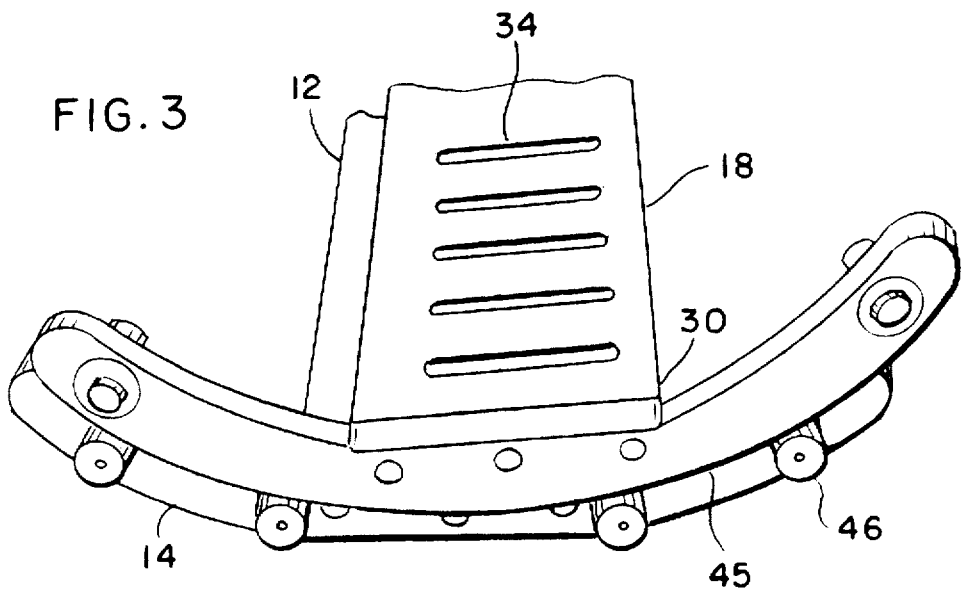
FIG. 3 is a front perspective view of the preferred embodiment, with the camera platform rotated above the base.

Now also referring to FIG. 3, rolling movement of the camera platform 18 and further details of the arc-shaped rails 14 and 16 may be described. The platform 18 may be rotated about 90 degrees to lie over the base 12 as shown in FIG. 3, and beyond another 90 degrees or so. The arc-shaped rail 16 of the platform 18 always lies slightly forward of the arc-shaped rail 14 of the base 12. Optionally, the assembly could be reversed and instead have the base rail 14 forward of the camera rail 16.

The underside 45 of the platform rail 16 is supported by four conventional roller bearings 46 projecting forward from the base rail 14. Optionally, these roller bearings 46 could instead be mounted to project aft of the platform rail 16 and ride on the top side of the base rail 14. Inside the conventional roller bearings 46 is a separator that holds a roller between the inner and outer rings of the bearing. Alternatively, other types of bearings could be utilized. The in-line roller bearings 46 (part no. CRS 13-12) were also purchased from Motion Industries.

Figure 4:
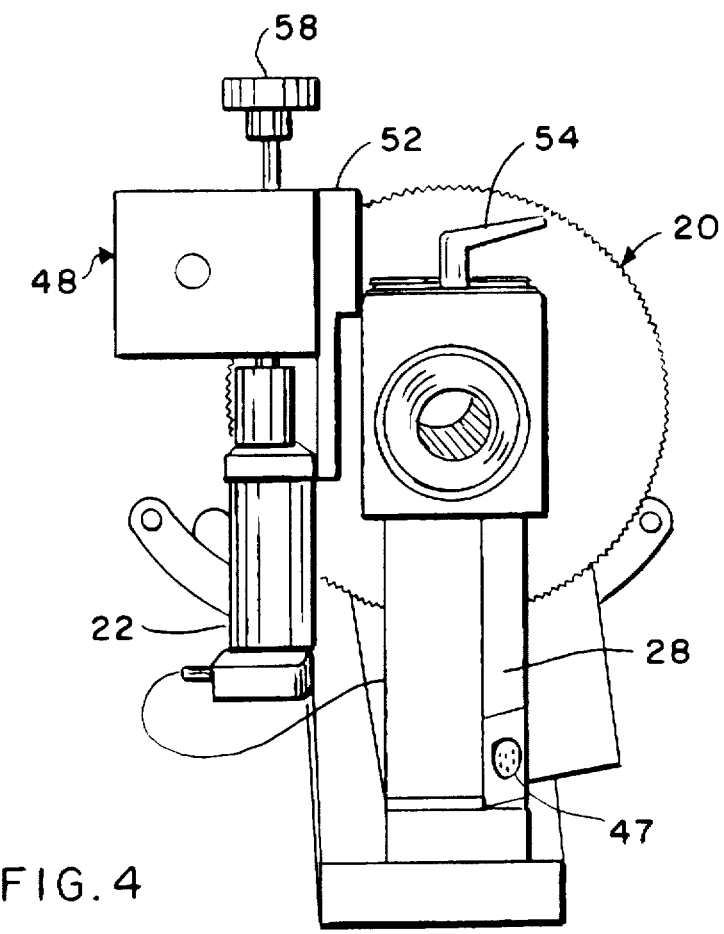
FIG. 4 is a rear perspective view of the drive motor of the preferred embodiment.
Figure 5:
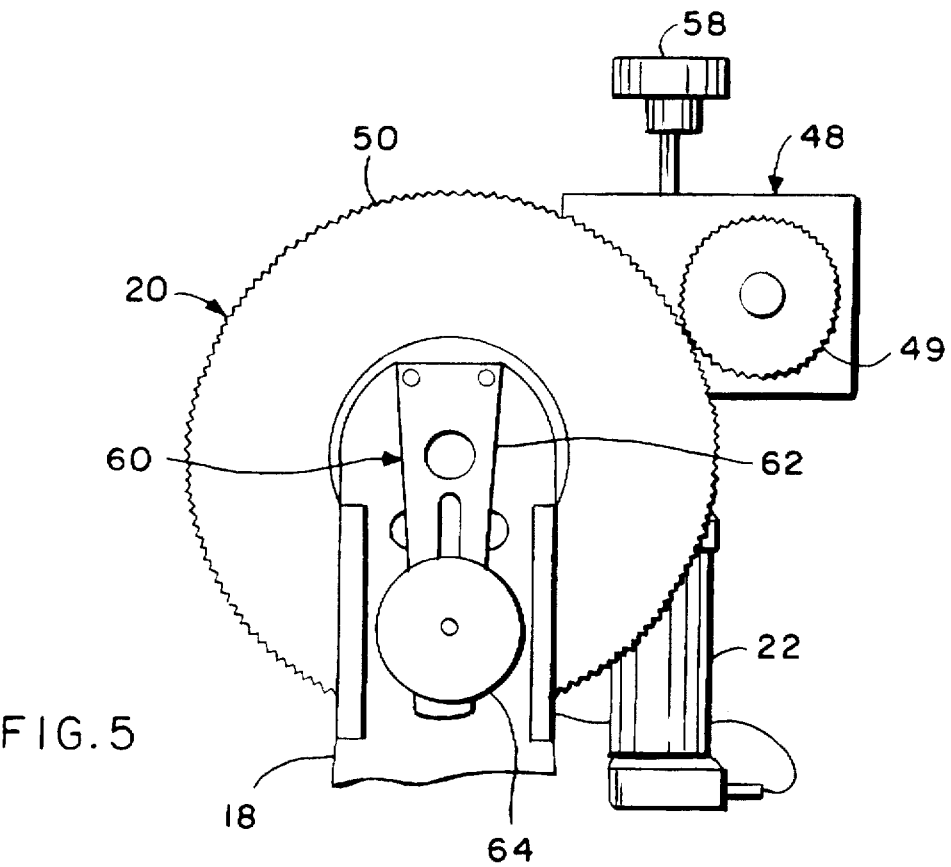
FIG. 5 is a front perspective view of the gear box of the preferred embodiment.
Figure 7:
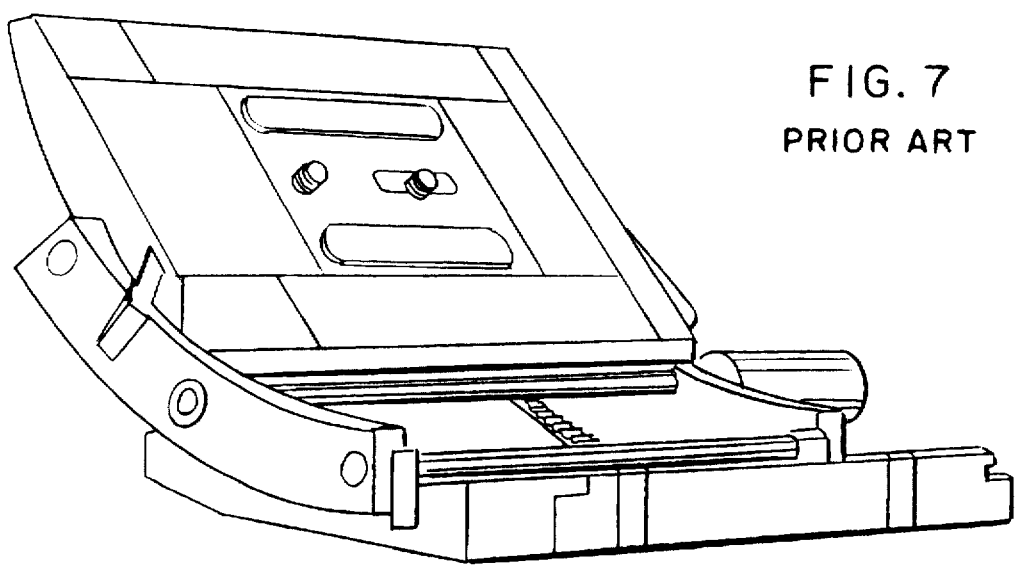
FIG. 7 is a front perspective view of a prior art device offering only limited rolling capability.

Now referring to FIGS. 4 and 5, the drive motor 22 and plurality of gears 20 which cause and effect the movement of the camera platform 18 may be described. The drive motor 22 is a conventional DC motor (part no. RE035-071-34EAF200A) which may be purchased from Maxon Precision Motors, Inc. of Burlingame, Calif. Current is fed to a coil that can rotate between poles of a magnet, and the magnetic field of the coil and that of the magnet interact and force the armature to turn, which turns the shaft. Power is provided to the motor 22 through a conventional receptacle 47 located in the upstanding post 28. There also exists the capability to provide information back from the motor 22, e.g., revolutions per minute or positional information, from an encoder to a digital readout device (not shown). A universal motor which can run on both direct and alternating current could alternatively be used.

The plurality of gears 20 includes a conventional gear box 48, which houses a worm gear (not shown) on the inside. The gear box 48 is part no. A2Z19-E0600 which may be purchased from Stock Drive Products Company of New Hyde Park, N.Y. The worm gear alters the direction of motion from the screw thread shaft of the DC motor 22, which meshes with a toothed wheel (not shown) inside the gear box 48.

Connected to a shaft extending outside the gear box 48 is a conventional small spur gear 49 having 60 teeth, which also may be purchased from Stock Drive Products Company. Meshed to the small spur gear 49 is a big wheel spur gear 50 having 224 teeth, which is fixedly attached to the aft end 32 of the camera platform 18. The spur gears 49 and 50 intermesh in the same plane and rotate in opposite directions. The small gear 49 rotates much faster to match the speed of the motor 22, while the large gear 50 provides much greater force to drive the camera platform 18.

The gear box 48 is attached to the upstanding post 28 of the base 12 through use of a bracket 52 and a locking knob 54. The bracket 52 is installed in a slot 56 in the upstanding center post 28 (best shown in FIG. 6), such that the position of the small spur gear 49 can be adjusted sideways relative the big wheel spur gear 50. Additionally, the gear box 48 includes an inching knob 58, which allows manual turning of the worm gear to drive the spur gears 49 and 50 in lieu of the electric motor 22. The locking knob 54 and inching knob 58 were purchased from Kipp-Elesa Company of Bloomfield Hills, Mich.

Another feature of the preferred embodiment is the counterbalancing means 60 for varying the center of gravity of the pivoting platform 18 and camera. It was found that the performance of the camera mount 10 improved if weight is added opposite the platform 18 and camera, which moves the center of gravity of the combination closer to the axis defined by the pivotal connection of the platform 18 to the base 12 and upstanding post 28. The counterbalancing means 60 includes a slotted arm 62 attached to the rear plate 37 of the platform 18, and a weight 64 attached thereto by a conventional fastener. Other arrangements of the counterbalancing means 60 are possible. For example, for a top-heavy camera the direction of the slotted arm 62 may be reversed such that the weight 64 lies near the platform 18, as shown in FIG. 5.

Having described the structure, it is now possible to describe the operation, function and use of the preferred embodiment. The camera mount 10 is installed by attaching the base 12 to a stationary object with conventional fasteners. The fastener heads occupy the selected Helicoil™ threaded inserts 27 in the base 12 so as not to protrude outside the base 12 and obstruct the path of the camera platform 18 past the base 12. The camera is also mounted to the camera platform 18 with conventional fasteners, and its power and video cables passed through the hollow shaft 39 and tapered bearings 38.

An electric motor 22 provides the drive to roll the camera mount 10 structure. Connecting the power source and turning on the motor 22 begins the rotation of the aft end 32 of the camera platform 18 about its pivotal connection to the upstanding post 28 of the base 12. The forward end 30 of the camera platform 18 and its platform arc-shaped rail 16 is movably supported by the base arc-shaped rail 14. The underside 42 of the platform rail 16 slides along atop the roller bearings 46 of the base rail 14. This part of the support structure supporting the front end of the camera is key in preventing any up-and-down bouncing motion as the platform 18 pivots and the camera rolls.

A plurality of gears 20 transmit the motion from the motor 22 to the camera platform 18. The direction of motion of the rotating shaft of the motor 22 is altered by the worm gear inside the gear box 48 attached to the motor 22. The resultant motion is found in the rotating toothed wheel, or small spur gear 49. This motion is next transmitted into the big wheel spur gear 50 and the camera-platform arm 18.

The gear box 48 and motor 22 are adjustably positioned to the big wheel gear 50. This occurs by temporarily loosening the locking knob 54 such that the slotted bracket 52 is able to slide, such that the small spur gear 49 properly meshes with the big wheel gear 50. The inching knob 58 may be used to check the operation of the system of gears 20 during setup, prior to turning on the power to the motor 22.

A number of bearings are employed to reduce friction between the moving parts of the camera mount 10. The tapered bearings 38 provide a tight but smoothly operating pivotal connection between the camera platform 18 and the upstanding post 28 of the base 12. Wear is not a problem since the shaft 39 only rotates at low speeds. Four conventional roller bearings 46 provide smooth sliding of the platform arc-shaped rail 16 over the base arc-shaped rail 14.

The lengthy arc-shaped rails 14 and 16 provide the capability to roll the camera 90 degrees either way from above the base 12, or a total of 180 degrees. The camera may roll either clockwise or counterclockwise, as reversing the direction of the motor 22 causes the camera platform 18 to roll the other way. The camera platform 18 preferably rotates about the approximate optical axis of the camera lens. Otherwise, the background shifts, which detracts from the true rolling movement of the camera.

It is understood that the exemplary camera mount described herein and shown in the drawings represents only a presently preferred embodiment of the invention. Indeed, various modifications and additions may be made to such embodiment without departing from the spirit and scope of the invention. The possible modifications and additions already mentioned above and others may be obvious to those skilled in the art, and may be implemented to adapt the present invention for use in a variety of applications.

What is claimed is:

1. A camera mount comprising:

a base having a forward end and an aft end;

a first arc-shaped rail connected to the forward end of the base;

a platform having a forward end and an aft end, the aft end of the platform pivotally connected to the aft end of the base; and a second arc-shaped rail connected to the forward end of the platform, the second arc-shaped rail coaxial with and movably supported by the first arc-shaped rail;

whereby rolling movement of a camera mounted on the platform is provided.

2. The camera mount of claim 1 further comprising a drive motor which causes the platform to pivot relative the base.

3. The camera mount of claim 1 further comprising a plurality of gears which connect the drive motor to the platform.

4. The camera mount of claim 3 wherein the plurality of gears comprise worm gears connected to the drive motor, connected to spur gears connected to the platform.

5. The camera mount of claim 1 wherein the arc-shaped rails each extend approximately 90 degrees.

6. The camera mount of claim 1 further comprising a plurality of rollers between the arc-shaped rails.

7. The camera mount of claim 6 wherein the plurality of rollers extend forward of the first arc-shaped rail and support an underside of the second arc-shaped rail.

8. The camera mount of claim 1 wherein the pivotal connection of the platform to the base is coaxial with the first and second arc-shaped rails.

9. The camera mount of claim 8 wherein the optical axis of the camera is approximately coaxial with the first and second arc-shaped rails.

10. The camera mount of claim 1 wherein the aft end of the base comprises an upstanding post having an upper end pivotally connected to the platform.

11. The camera mount of claim 1 wherein the forward end of the platform is configured to hold the camera near the second arc-shaped rail, and the aft end of the platform angles toward an upstanding post.

12. The camera mount of claim 1 further comprising a counterbalancing means adjustably attached to the platform, for adjusting the center of gravity of the pivoting platform including the weight of the camera.

13. The camera mount of claim 10 wherein the pivotal connection of the upstanding post to the platform is accomplished by a hollow bearing to accommodate passage of cables to the camera.

14. The camera mount of claim 13 wherein the hollow bearing is a pair of tapered bearings.

15. The camera mount of claim 14 further comprising counterbalancing means adjustably attached to the platform, for adjusting the center of gravity of the pivoting platform including the weight of the camera.

16. A camera mount comprising:

a base having a forward end and an aft end;

a platform having a forward end and an aft end, the aft end of the platform pivotally connected to the aft end of the base;

a first arc-shaped rail connected to the forward end of the base;

a second arc-shaped rail connected to the forward end of the platform, the second arc-shaped rail coaxial with and movably supported by the first arc-shaped rail;

the arc-shaped rails each extend approximately 90 degrees such that the platform may be rolled approximately 180 degrees;

the pivotal connection of the platform to the base is coaxial with the first and second arc-shaped rails, and the optical axis of the camera is approximately coaxial with the first and second arc-shaped rails; and a drive motor which causes the platform to pivot relative the base, and a plurality of gears which connect the drive motor to the platform.

17. The camera mount of claim 16 further comprising a plurality of rollers connected to the first arc-shaped rail which support the second arc-shaped rail.

18. The camera mount of claim 17 wherein the plurality of rollers extend forward of the first arc-shaped rail, and support an underside of the second arc-shaped rail.

19. The camera mount of claim 16 wherein the aft end of the base comprises an upstanding post having an upper end pivotally connected to the platform.

\* \* \* \* \*